F. I. DU PONT.
APPARATUS FOR LIQUID SEPARATION OF SOLIDS.
APPLICATION FILED FEB. 2, 1910.
1,106,195.
Patented Aug. 4, 1914.
4 SHEETS—SHEET 3.
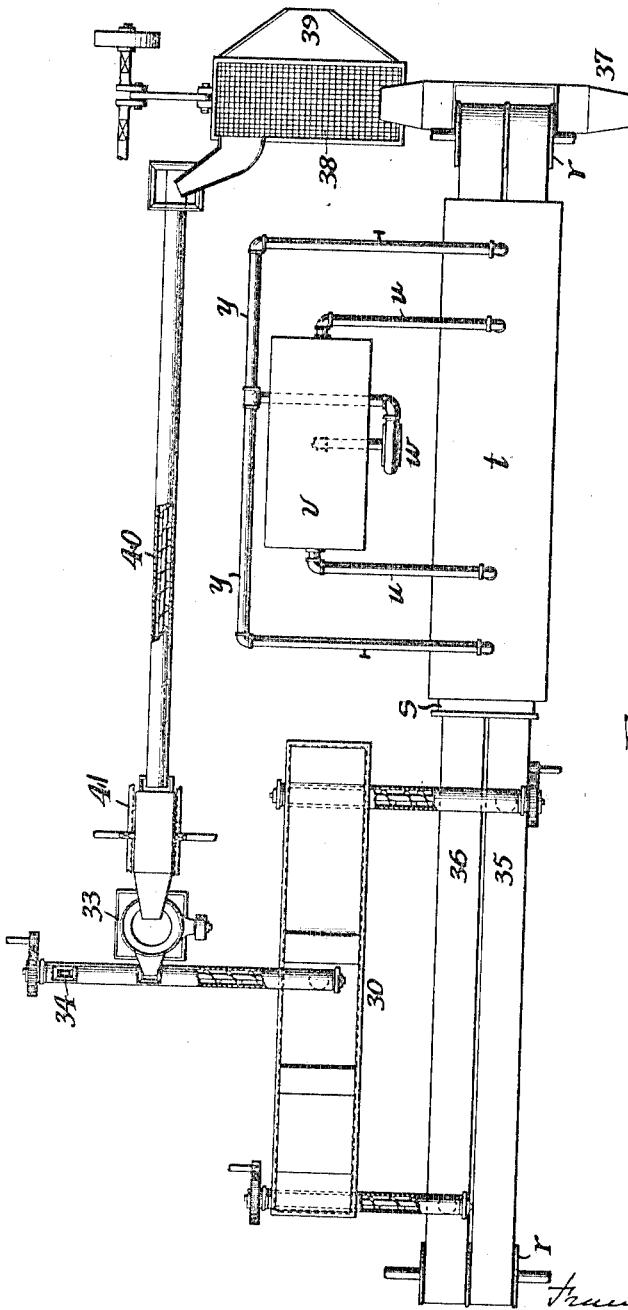
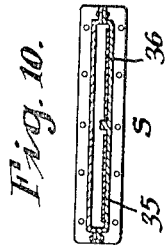

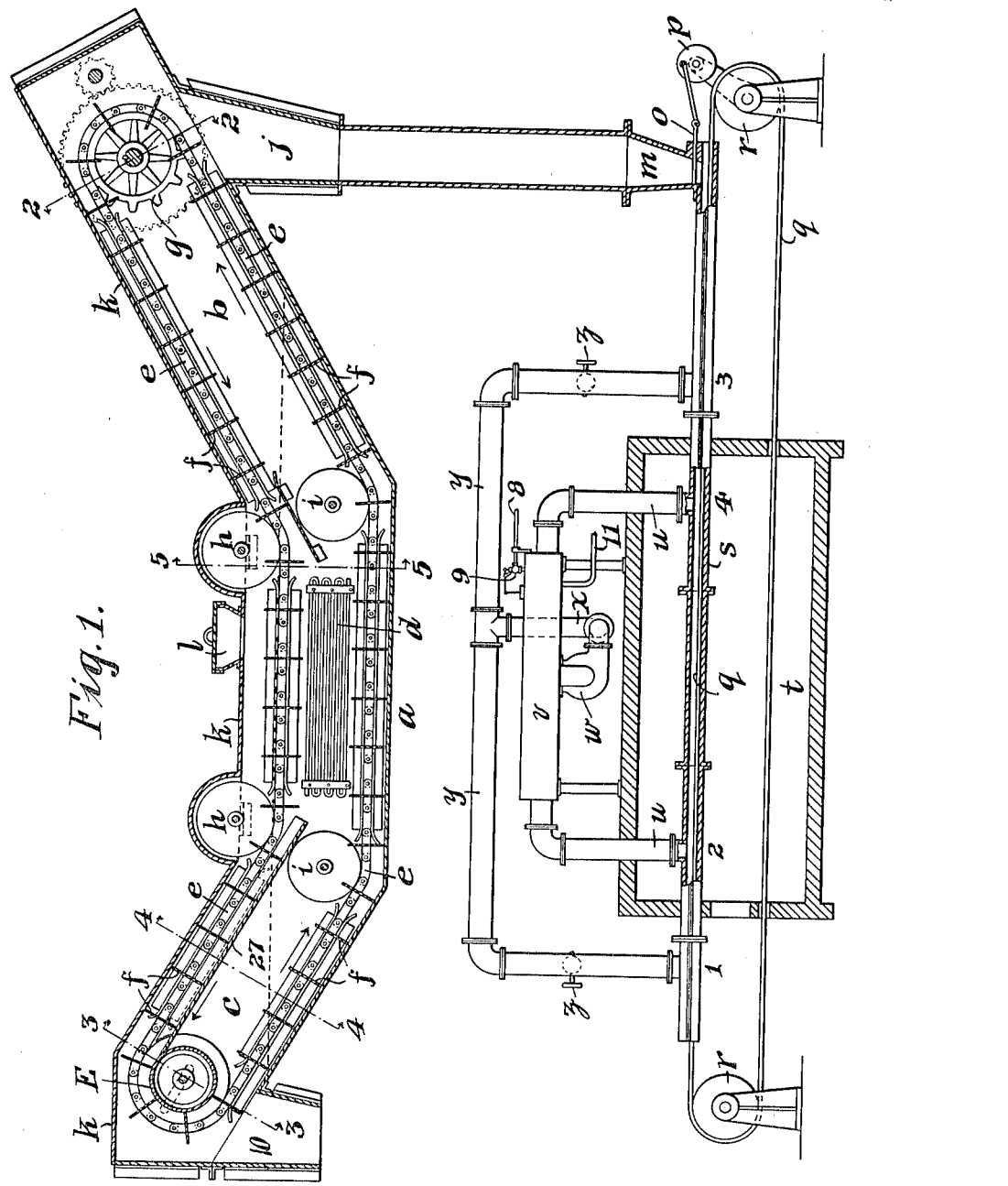

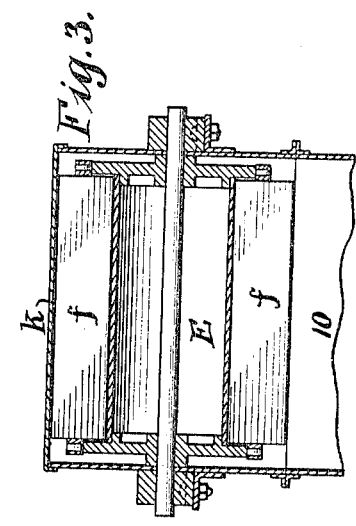
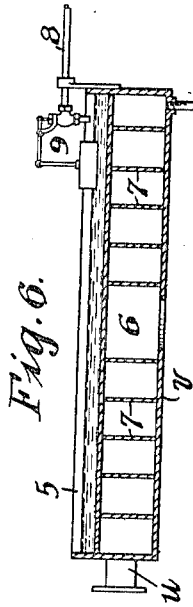
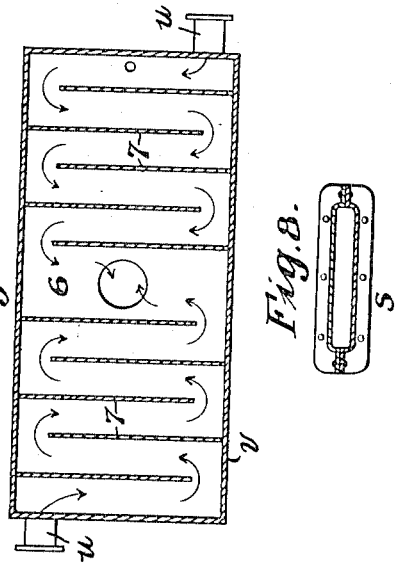
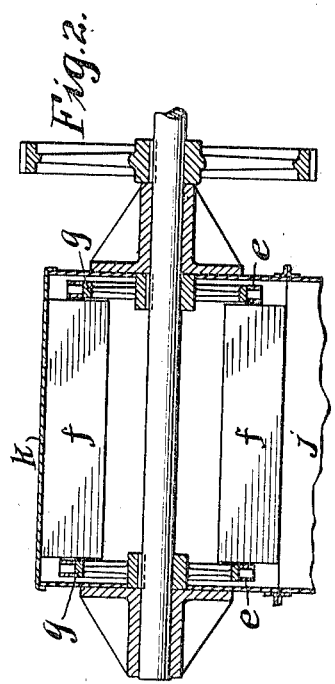
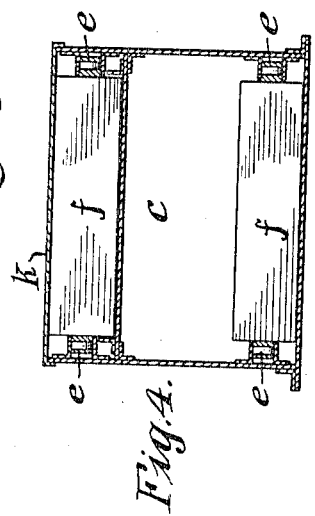
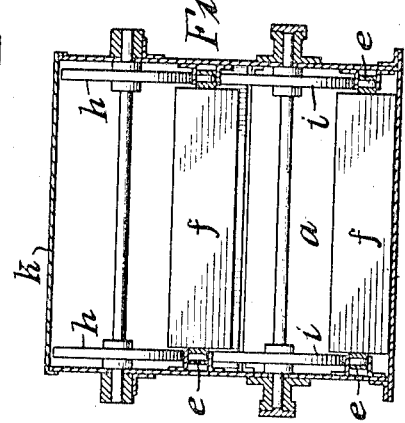

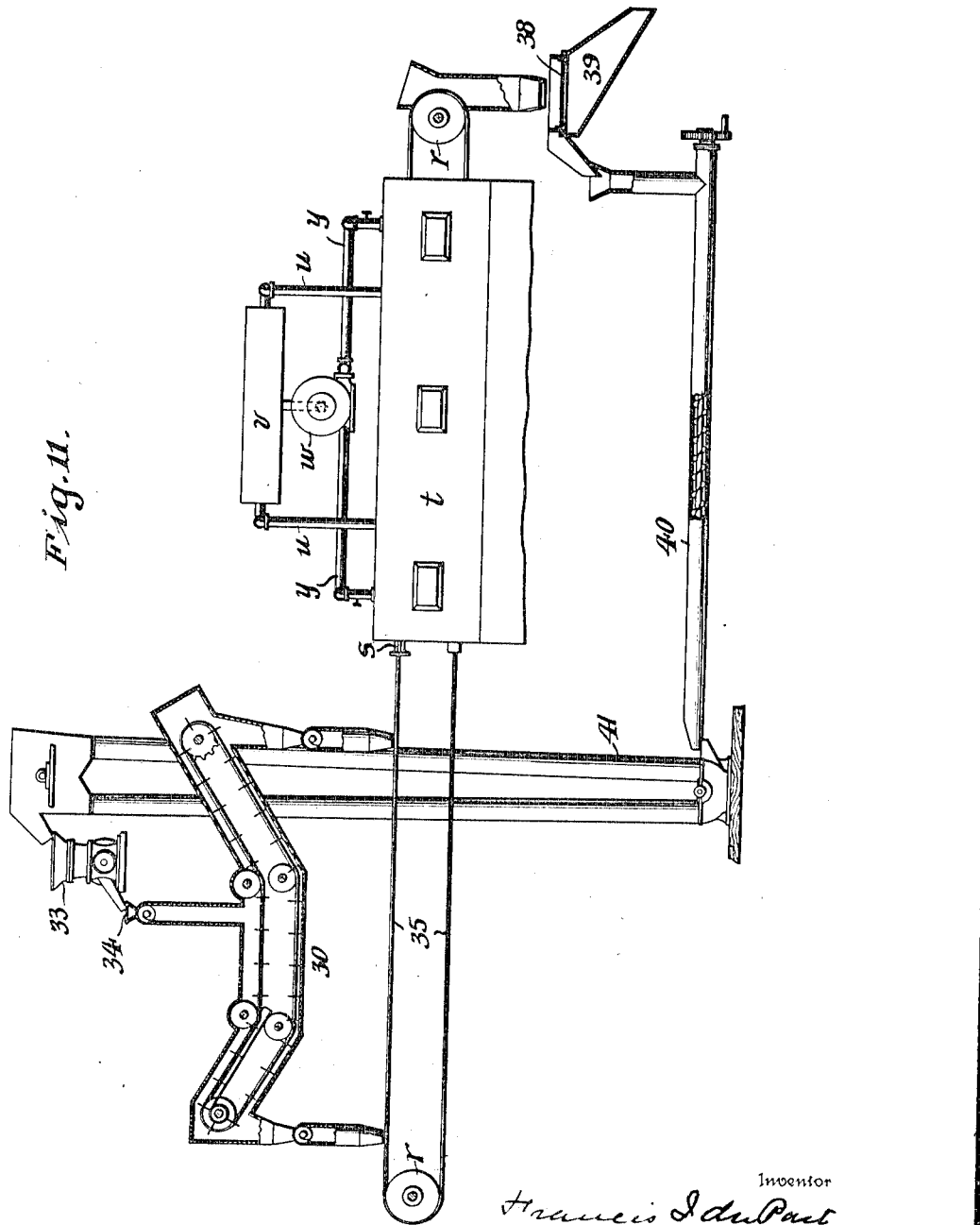

UNITED STATES PATENT OFFICE.

FRANCIS I. DU PONT, OF WILMINGTON, DELAWARE, ASSIGNOR TO INTERNATIONAL HALOID COMPANY, A CORPORATION OF DELAWARE.

APPARATUS FOR LIQUID SEPARATION OF SOLIDS.

1,106,195.      Specification of Letters Patent.      Patented Aug. 4, 1914.

Application filed February 2, 1910. Serial No. 541,545.

*To all whom it may concern:*

Be it known that I, FRANCIS I. DU PONT, a citizen of the United States, residing at Wilmington, county of New Castle, and State of Delaware, have invented a new and useful Improvement in Apparatus for Liquid Separation of Solids, of which the following is a full, clear, and exact description, reference being had to the accompanying drawings, which form a part of this specification.

My invention relates to an apparatus for the liquid gravity separation of solids of different specific gravities, a preferred embodiment of which is hereinafter described and is illustrated in the accompanying drawings, in which—

Figure 1 is a vertical section through a liquid separator and treating furnace partially shown in elevation. Fig. 2 is a section on line 2—2 of Fig. 1. Fig. 3 is a section on line 3—3 of Fig. 1. Fig. 4 is a section on line 4—4 of Fig. 1. Fig. 5 is a section on line 5—5 of Fig. 1. Fig. 6 is a vertical section of the condenser showing the float valve in elevation. Fig. 7 is a horizontal section of the condenser. Fig. 8 is a cross section of the guide which passes through the furnace. Fig. 9 is a plan view of a continuously conducted separator. Fig. 10 is a cross section of a double guide which passes through the furnace. Fig. 11 is a sectional elevation of the apparatus shown in Fig. 9.

$a$, $b$, $c$, is a tank, $a$ being a central horizontal portion, $b$ being an inclined portion at one end of the central horizontal portion, and $c$ being an inclined portion projecting from the other end of the central horizontal portion. In this tank is a liquid, for instance, bromid of antimony, as the separating liquid.

If the liquid to be used is a material which is not a liquid at ordinary temperature, I provide in the tank the heating coils $d$. In this tank are the conveyer chains $e$, between which are flights $f$ formed of rectangular plates. These conveyer chains are driven by the sprocket wheels $g$ and are guided by the rollers $h$ and $i$. The diameter of the sprocket $g$, the rollers $h$ and the position of the rollers $i$ are such that in the portion $a$ of the tank one section of the conveyer is at the upper portion of the liquid and the other section of the conveyer is at the lower portion of the liquid. The conveyer travels in the direction of the arrow and at a slow speed.

In order to prevent the deleterious effect of any fuming where the liquid fumes at all at ordinary temperatures, it is advisable in practice to provide a cover $k$ for the tank. This cover is provided with an opening $l$ about central of the horizontal section $a$ of the tank, through which opening the material is fed into the tank.

By specific gravity the constituents separate, the heavier falling to the bottom and the lighter remaining in the upper portion. The conveyer, which in its travel moves quite slowly, in the lower section, by means of the flights catches the heavier constituents, drawing them up the incline $b$. The liquid carried by the flights, when the flights pass beyond the liquid level of the tank, will drain off from the flights; and the solid constituents, although the liquid has drained off, will still be wet with it, and will be carried to a point where the chute $j$ opens, through which they may be discharged. The flights on the upper section of the chain will catch and carry with them the light constituents, carrying them up the incline $c$, and when the flights have reached a point above the liquid the same will drain from them. The inclined bottom 27 and roller E will prevent the escape of the solids until the flights have passed around the roller when, being uncovered, they aline with the chute 10.

In order to remove the liquid carried by the constituents and recover the same I use the following construction. The material may be carried or fed from the chutes $j$ into a hopper $m$. The bottom of this hopper may be provided with a slide $o$ normally closed and operated by an eccentric $p$, the operation of which allows graded quantities to pass out of the mouth of the hopper.

$q$ is an iron band caused to travel around the rollers $r$ by appropriate means. Its movement should be quite slow. This band $q$ passes through a cast iron passage $s$, shown in section, Fig. 8. This cast iron passage $s$ extends to and through a furnace $t$ which may be heated by any appropriate means. The hottest part of this furnace is in the center and from that part extend two pipes $u$ which lead to a condenser $v$. From the middle part of this condenser the vapors are drawn off by means of a fan $w$ and discharged into the pipe $x$. This pipe $x$ has two pipe connections $y$ extending to the cast iron passage outside of the point from which the pipes $u$ are led and at a little distance from said pipes $u$.

Upon the pipes $y$ are the dampers $z$. By means of the dampers $z$ the amount of air which passes through each of the pipes $y$ may be adjusted each in its relation to the other. By this arrangement, it will be noticed that the circulation is so arranged that in the hottest part of the recovery apparatus there is no circulation in either direction and practically a dead space. The purpose of this is that the circulation of air may not interfere with the heating effect which is desired.

It will be noted that the pipes $y$ deliver the air into parts of the apparatus cooler than those from which the air passes by the pipes $u$. This also avoids a loss of heat and in addition to this has the effect of subjecting hot pieces of ore to a draft which has been freed to a great extent from the vapors of the liquid which it is desired to recover.

The band $q$, passing through the cast iron conduit $s$, would, without the construction described, carry a certain amount of air with it, which, if it was allowed to pass through freely, might result in a possible loss of liquid. By properly arranging and adjusting the dampers $z$, an exact balance may be obtained and thus prevent any outside air being allowed to circulate through this cast iron conduit $s$. This is accomplished by adjusting the amount of air which would tend to pass from 1 to 2 in its relation to the amount of air which would tend to pass from 3 to 4, so that the friction of these amounts of air in the conduit will exactly counterbalance any tendency of the air to be carried in or out of the cast iron conduit $s$ at its ends.

The condenser which I use is constructed as follows. It is a rectangular vessel having an open top forming a water pan 5 and a lower section 6, through or in which are formed zig zag conduits 7, so that the air and vapors which pass into the condenser through the pipes $u$ follow the course indicated by the arrows, the divisions insuring a long conduit in contact with the bottom of the water pan, which water pan acts as a condenser. This pan is kept full of water but is not supplied with any overflow. It is filled with water by means of the pipe 8 and is regulated to keep the tank full by means of the float valve 9. This water is allowed to heat to its boiling point or even to boil, so that the condenser is prevented from reaching a point above the boiling point of water, which is the condition desired when the separated liquid used is such as bromid of antimony, which becomes liquid at 93° C., but whose point of volatilization is much higher. Were the condenser kept cool and at a low point of temperature, the material would solidify in it and make handling of the same awkward. With the arrangement described, the materal is maintained as a liquid and passes out through the pipe 10 as a liquid. This pipe 10 may be at any point on the bottom of the condenser and may extend to the tank to return the liquid recovered to the body of separating liquid. The material passing through chute 10 may be treated in a similar manner to remove, recover and return its carried liquid.

It may be desired to arrange the apparatus so that the separation may be conducted continuously and those portions of the material being treated which contain waste material may be crushed sufficiently fine so that the waste material may be separated from the good ore or heavier solid to which it adheres. Such an arrangement is indicated in Fig. 9, in which 30 is the separating tank just described. There is a recovery apparatus, for each separated constituent, the same as just described, except that in this case there is a double conduit $s$ providing for two separate bands $q$ through the heating chamber. A section of this double conduit is indicated in Fig. 10, where it will be seen that the two conduits are in communication with each other so that vapors may pass from either one of the pipes indiscriminately. 33 is a crusher. In the operation of this arrangement the solids, for example, iron ore, are fed in at 34, where they are conveyed by means of the conveyer shown to the tank 30 where separation of the lighter from the heavier constituents takes place, as before described, the heavier constituent falling on to the band 35 and the lighter constituent on to the band 36. These constituents are carried by means of the bands through the recovery apparatus and from these constituents the liquid is recovered and may be returned to the tank 30. The heavier constituent then falls into the hopper 37 where it is disposed of as may be desired. The lighter constituent falls on to a shaking sieve 38. Such portion as passes through this sieve falls into the chute 39 and is disposed of as waste, that portion which does not pass through the sieve is conveyed by means of the conveyer 40 and elevator 41 through the crusher 33 and again to the tank 30, where such portions of good ore as have been separated from the waste by crushing are passed as before described through the separator and recovery apparatus and into the hopper 37, whereas such portions as are not of the grade desired, which may be determined by the specific gravity of the liquid in tank 30, pass on to the band 36 and again go through the sieving apparatus.

By deciding upon the size of the mesh in the sieve 38 it is possible to arrange the apparatus so that it will reject waste material only after it has been crushed down to such size as is desired. This will determine the degree to which the separation of the good ore from the waste material is effected, and it will be dependent upon the character of the ore which is being treated.

Having now fully described my invention, what I claim and desire to protect by Letters Patent is:—

1. The combination with a tank adapted to hold the separating liquid having an outlet from which the separated constituent is discharged, of a conveyer, a conduit through which the conveyer travels, means to heat the conduit, a condenser, a pipe leading to the condenser from the conduit at a relatively hot part of the latter, a vapor discharge from the condenser and a pipe leading from the vapor discharge to the conduit at a relatively cool part of the latter, and means to deliver material from the tank outlet to the conveyer, said tank, conduit and condenser being closed against direct connection with the external atmosphere.

2. The combination with a tank adapted to hold the separating liquid having an outlet from which the separated consituent is discharged, of a conveyer, a conduit through which the conveyer travels, means to heat the conduit, a condenser, pipes leading to the condenser from the conduit at a relatively hot part of the latter, a vapor discharge from the condenser, pipes leading from the vapor discharge to the conduit at a relatively cooler part of the latter, dampers on the last named pipes, and means to deliver material from the tank outlet to the conveyer, said tank, conduit and condenser being closed against direct connection with the external atmosphere.

3. The combination with a tank to hold the separating liquid having an outlet from which the separated constituent is discharged, of a conveyer, a furnace, a conduit extending through the furnace and through which the conveyer travels, a condenser, a pipe leading from the conduit, at a relatively hot part of the furnace, to the condenser, a vapor discharge pipe from the condenser and a pipe leading therefrom to the conduit at a relatively cool part thereof, and means to deliver material from the tank outlet to the conveyer, said tank, conduit and condenser being closed against direct connection with the external atmosphere.

4. The combination with a tank to hold the separating liquid having an outlet from which the separated constituent is discharged, of a hopper communicating with the discharge, a conveyer on which said hopper opens, means to deliver material from the hopper to the conveyer, a conduit through which said conveyer travels, means to heat the conduit, a condenser, a pipe leading from a relatively hot part of the conduit to the condenser, a vapor discharge from the condenser, and a pipe leading from the vapor discharge to the conduit at a relatively cool part of the latter, said tank, hopper, conduit and condenser being closed against direct connection with the external atmosphere.

5. The combination with a tank to hold the separating liquid having an outlet from which the separated constituent is discharged, of a hopper communicating with the discharge, a conveyer on which said hopper opens, means to deliver material from the hopper to the conveyer, a conduit through which said conveyer travels, a furnace through which the conduit extends, a condenser, pipes leading from the conduit at a relatively hot part of the furnace, a vapor discharge from the condenser, and pipes leading from the pipe discharge to the conduit outside of the pipes leading from the conduit to the condenser, said tank, hopper, conduit and condenser being closed against direct connection with the external atmosphere.

In testimony of which invention, I have hereunto set my hand, at Philadelphia, on this 31st day of January, 1910.

FRANCIS I. du PONT.

Witnesses:
M. M. HAMILTON,
A. M. URIAN.